US012603880B2

(12) United States Patent
Yan et al.

(10) Patent No.: US 12,603,880 B2
(45) Date of Patent: Apr. 14, 2026

(54) BLOCKCHAIN-BASED SDP ACCESS CONTROL METHOD AND APPARATUS

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Junzhi Yan, Beijing (CN); Bo Yang, Beijing (CN); Li Su, Beijing (CN); Shen He, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 308 days.

(21) Appl. No.: 18/260,315

(22) PCT Filed: Dec. 30, 2021

(86) PCT No.: PCT/CN2021/143076
§ 371 (c)(1),
(2) Date: Jul. 3, 2023

(87) PCT Pub. No.: WO2022/143898
PCT Pub. Date: Jul. 7, 2022

(65) Prior Publication Data
US 2024/0056439 A1 Feb. 15, 2024

(30) Foreign Application Priority Data
Jan. 4, 2021 (CN) .......................... 202110001451.7

(51) Int. Cl.
| | | |
|---|---|---|
| H04L 9/40 | (2022.01) | |
| H04L 9/00 | (2022.01) | |
| H04L 9/08 | (2006.01) | |

(52) U.S. Cl.
CPC .......... *H04L 63/083* (2013.01); *H04L 9/0825* (2013.01); *H04L 9/50* (2022.05); *H04L 63/0428* (2013.01)

(58) Field of Classification Search
CPC ..... H04L 63/083; H04L 63/0428; H04L 9/50; H04L 9/0825
See application file for complete search history.

(56) References Cited

U.S. PATENT DOCUMENTS

| | | |
|---|---|---|
| 10,972,478 B2 | 4/2021 | Pang |
| 11,038,682 B2 | 6/2021 | Xie |
| | (Continued) | |

FOREIGN PATENT DOCUMENTS

| | | |
|---|---|---|
| CN | 107980216 A | 5/2018 |
| CN | 109117668 A | 1/2019 |
| | (Continued) | |

OTHER PUBLICATIONS

"Software-defined perimeter Wikipedia", Jul. 7, 2020 (Jul. 7, 2020), XP093154011,Retrieved from the Internet: <URL: https://en.wikipedia.org/w/index.php?title=Software-defined_perimeter&oldid=966585613 >, [retrieved on Apr. 22, 2024], the whole document, 6 pages.

(Continued)

*Primary Examiner* — Chau Le
(74) *Attorney, Agent, or Firm* — Syncoda LLC; Feng Ma

(57) ABSTRACT

In a blockchain-based SDP access control method and apparatus, an SDP connection initiation host submits identity authentication request information to a blockchain system node, receives an authentication result feedback after (Continued)

An SDP connection accepting host transmits to-be-verified information to a blockchain system node, the to-be-verified information including host information and a supported connection policy of the SDP connection accepting host, so that the to-be-verified information will be verified by the blockchain system node, and be recorded into a blockchain ledger after the verification is successful ~ S11

The SDP connection accepting host receives a connection request transmitted by an SDP connection initiating host ~ S12

The SDP connection accepting host searches in the blockchain ledger for a list of SDP connection accepting hosts accessible to the SDP connection initiating host, and provides an access service to the SDP connection initiating host when the SDP connection accepting host is in the list of SDP connection accepting hosts ~ S13 verification; sends, to the blockchain system node, a query request for an SDP connection accepting host list that can be accessed, the query request including an authentication result of the blockchain system node for the SDP connection initiation host; after verifying the query request, the blockchain system node queries the SDP connection accepting host list that can be accessed by the SDP connection initiation host, and records the SDP connection accepting host list to a blockchain ledger; the SDP connection initiation host initiates a connection request to the SDP connection accepting host, queries the SDP connection accepting host list that can be accessed by the SDP connection initiation host; and if so, then access service is provided.

16 Claims, 6 Drawing Sheets

(56) References Cited

U.S. PATENT DOCUMENTS

| | | | | |
|---|---|---|---|---|
| 11,190,494 | B2 | 11/2021 | Kim | |
| 11,381,557 | B2 | 7/2022 | Kim | |
| 12,205,105 | B2 * | 1/2025 | Harrison | G06Q 20/367 |
| 2019/0109713 | A1 | 4/2019 | Clark | |
| 2019/0188046 | A1 | 6/2019 | Florissi | |
| 2019/0207762 | A1 * | 7/2019 | Xie | H04L 9/30 |
| 2019/0386969 | A1 | 12/2019 | Verzun | |
| 2020/0120105 | A1 * | 4/2020 | Pang | H04L 63/101 |
| 2020/0257778 | A1 | 8/2020 | Pham | |
| 2021/0029163 | A1 * | 1/2021 | Behl | H04L 67/1097 |
| 2021/0217001 | A1 | 7/2021 | Harrison | |
| 2024/0323037 | A1 * | 9/2024 | Yan | H04L 9/0861 |

FOREIGN PATENT DOCUMENTS

| | | | |
|---|---|---|---|
| CN | 109561066 | A | 4/2019 |
| CN | 110336813 | A | 10/2019 |
| CN | 110809006 | A | 2/2020 |
| CN | 111181944 | A | 5/2020 |
| CN | 111835528 | A | 10/2020 |
| EP | 3367289 | A1 | 8/2018 |
| KR | 102007913 | B1 | 8/2019 |
| WO | 2018214165 | A1 | 11/2018 |
| WO | 2019104690 | A1 | 6/2019 |

OTHER PUBLICATIONS

Alan Boehme:"Software Defined Perimeter", Dec. 31, 2013 (Dec. 31, 2013), XP093154007, Retrieved from the Internet: URL: https://downloads. cloudsecurityallianc e. org/initiatives/sdp/Software_Defined_Per imeter. pdf, p. 6-p. 8, figures 1, 2, 13pages.

Supplementary European Search Report in the European application No. 21914665.1, mailed on May 3, 2024, 11 pages.

Junzhi Yan et al., "Blockchain based software defined perimeter ( SDP ) in support of authentication and authorization", 2022 International Conference on Blockchain Technology and Information Security(ICBCTIS), pp. 40-42.

International Search Report in the international application No. PCT/CN2021/143221, mailed on Mar. 1, 2022. 5 pages with English translation.

International Search Report in the international application No. PCT/CN2021/143076, mailed on Mar. 14, 2022. 6 pages with English translation.

English translation of the Written Opinion of the International Search Authority in the international application No. PCT/CN2021/143221, mailed on Mar. 1, 2022. 7 pages with English translation.

English translation of the Written Opinion of the International Search Authority in the international application No. PCT/CN2021/143076, mailed on Mar. 14, 2022. 7 pages with English translation.

Xu L, et al., "DL-DP: Improving the Security of Industrial IoT with Decentralized Ledger Defined Perimeter", In Proceedings of the 2nd ACM International Symposium on Blockchain and Secure Critical Infrastructure, Oct. 6, 2020. (pp. 53-62). 10 pages.

"Software-Defined Perimeter", Mar. 10, 2020, pp. 13-14, https://web.archive.org/web/20200825011637/https://www.cloudsecurityalliance.jp/site/wp-content/uploads/2020/03/sdp_architecture_guide_v2_J_FINAL.pdf.

* cited by examiner

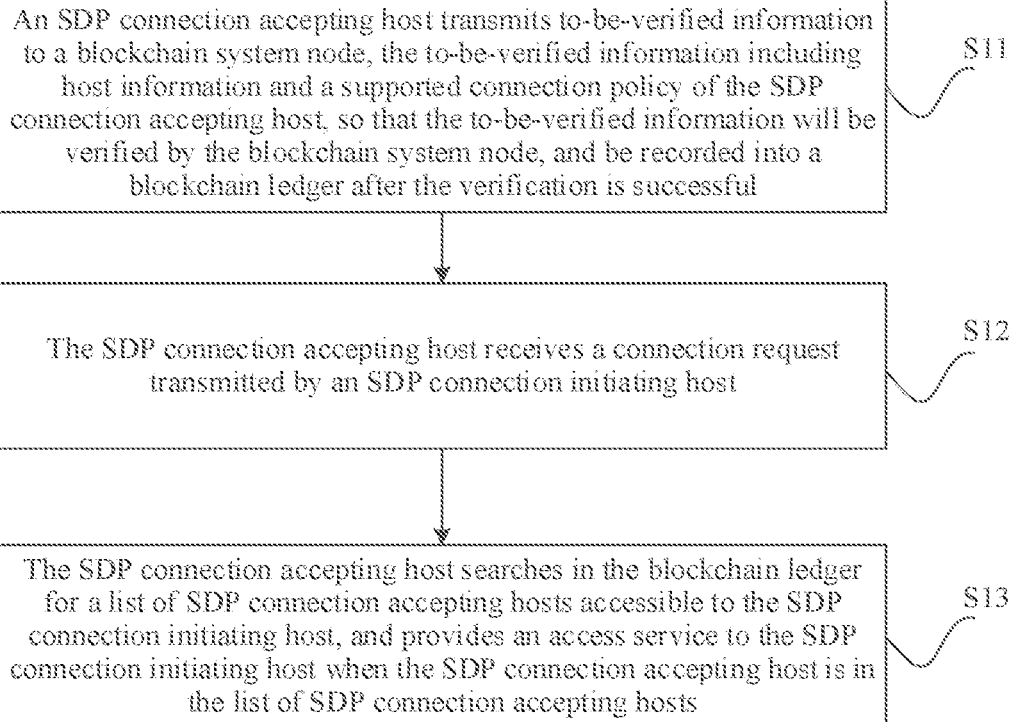

An SDP connection accepting host transmits to-be-verified information to a blockchain system node, the to-be-verified information including host information and a supported connection policy of the SDP connection accepting host, so that the to-be-verified information will be verified by the blockchain system node, and be recorded into a blockchain ledger after the verification is successful — S11

The SDP connection accepting host receives a connection request transmitted by an SDP connection initiating host — S12

The SDP connection accepting host searches in the blockchain ledger for a list of SDP connection accepting hosts accessible to the SDP connection initiating host, and provides an access service to the SDP connection initiating host when the SDP connection accepting host is in the list of SDP connection accepting hosts — S13

FIG. 4

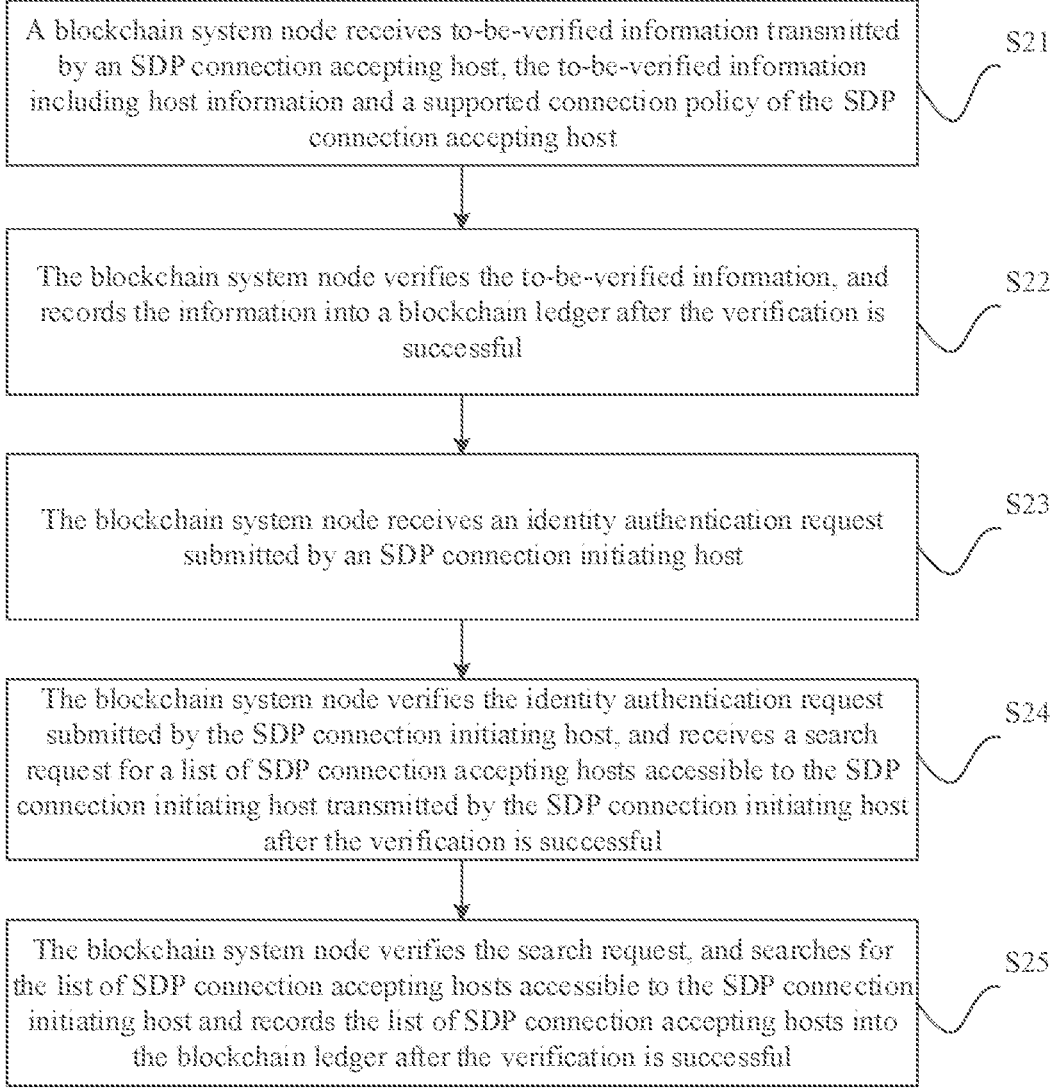

A blockchain system node receives to-be-verified information transmitted by an SDP connection accepting host, the to-be-verified information including host information and a supported connection policy of the SDP connection accepting host          S21

The blockchain system node verifies the to-be-verified information, and records the information into a blockchain ledger after the verification is successful          S22

The blockchain system node receives an identity authentication request submitted by an SDP connection initiating host          S23

The blockchain system node verifies the identity authentication request submitted by the SDP connection initiating host, and receives a search request for a list of SDP connection accepting hosts accessible to the SDP connection initiating host transmitted by the SDP connection initiating host after the verification is successful          S24

The blockchain system node verifies the search request, and searches for the list of SDP connection accepting hosts accessible to the SDP connection initiating host and records the list of SDP connection accepting hosts into the blockchain ledger after the verification is successful          S25

FIG. 5

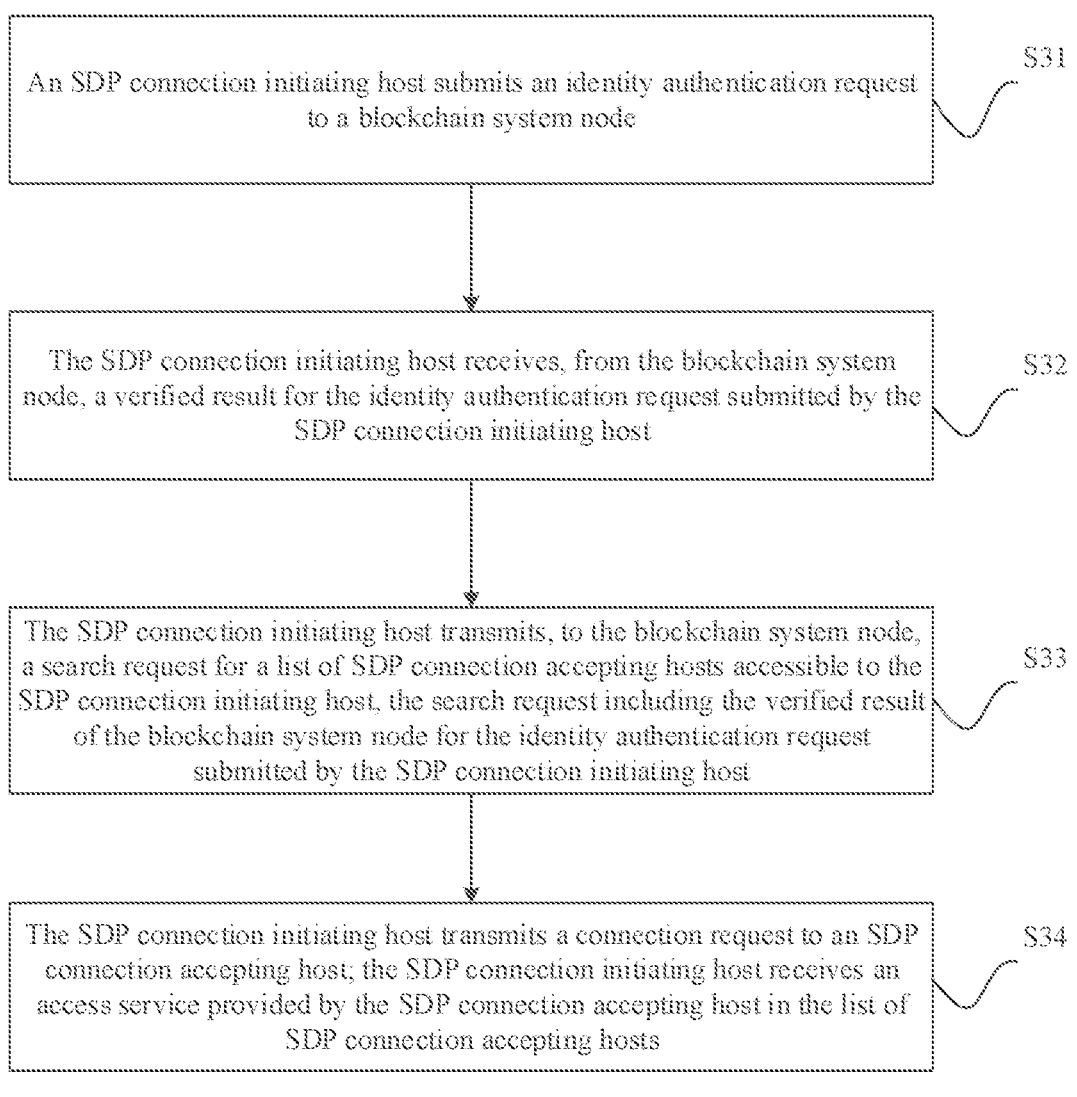

An SDP connection initiating host submits an identity authentication request to a blockchain system node — S31

The SDP connection initiating host receives, from the blockchain system node, a verified result for the identity authentication request submitted by the SDP connection initiating host — S32

The SDP connection initiating host transmits, to the blockchain system node, a search request for a list of SDP connection accepting hosts accessible to the SDP connection initiating host, the search request including the verified result of the blockchain system node for the identity authentication request submitted by the SDP connection initiating host — S33

The SDP connection initiating host transmits a connection request to an SDP connection accepting host; the SDP connection initiating host receives an access service provided by the SDP connection accepting host in the list of SDP connection accepting hosts — S34

FIG. 6

41 — First information verification module

42 — Connection request initiation module

43 — First request response module

FIG. 7

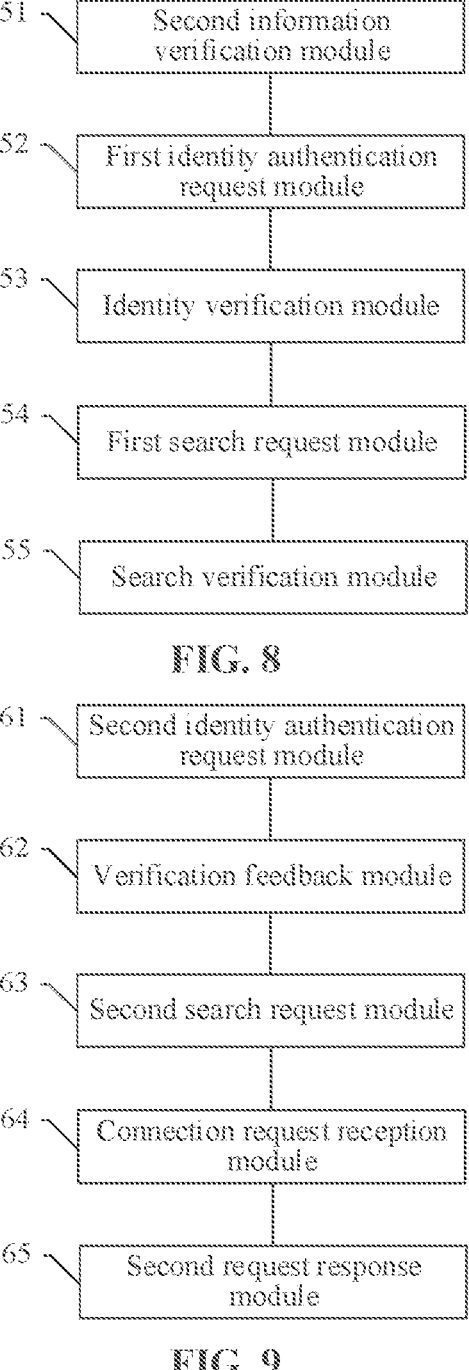

51 — Second information verification module

52 — First identity authentication request module

53 — Identity verification module

54 — First search request module

55 — Search verification module

FIG. 8

61 — Second identity authentication request module

62 — Verification feedback module

63 — Second search request module

64 — Connection request reception module

65 — Second request response module

FIG. 9

BLOCKCHAIN-BASED SDP ACCESS CONTROL METHOD AND APPARATUS

CROSS-REFERENCE TO RELATED APPLICATIONS

This is a national stage of International Application No. PCT/CN2021/143076 filed on Dec. 30, 2021 which claims priority to Chinese Patent Application No. 202110001451.7 filed on Jan. 4, 2021. The disclosures of the above-referenced applications are hereby incorporated by reference in their entirety.

TECHNICAL FIELD

The disclosure relates to the technical field of network securities, and in particular to a method and device for blockchain-based access control of Software Defined Perimeter (SDP).

BACKGROUND

SDP is intended to enable an application owner to deploy perimeter securities as required, to isolate services from insecure networks. The SDP replaces a physical device with a logical component controllable by the application owner, and only after device authentication and identity authentication, the SDP allows access to application infrastructures.

With reference to FIG. 1, SDP includes two parts: an SDP host and an SDP controller. The SDP host may create a connection or accept a connection. The SDP controller is mainly responsible for host authentication and policy distribution. The SDP host interacts with the SDP controller through a secure control channel. The SDP host includes an SDP connection initiating host (IH) and an SDP connection accepting host (AH).

The SDP has changed a conventional website connection mode. In the conventional connection mode, a client needs to establish a connection with a server, which enables the server to be exposed in a public network. The server may be utilized when it has a vulnerability, for example, a user name and a password may be stolen if a user inputs the user name and the password through a login page. Furthermore, multifactor authentication may be used in addition to the user name and the password, and loss of the user name and password may be prevented by the multi-factor authentication. However, the multi-factor authentication is not very friendly to the user.

At the present stage, in an SDP system, the SDP controller controls information such as an accessible service list of IH, an Internet Protocol (IP) address of AH, connection parameters (such as a port number, a protocol, or the like), or the like. Since the SDP controller is a centralized device, the SDP controller is exposed in the network, and is easily subjected to a network attack such as Distributed Denial of Service (DDoS), or the like. Once the controller is out of service due to the network attack, it is possible that the entire system cannot operate normally, and IH will be unable to perform any data access.

SUMMARY

The disclosure provides methods and devices for blockchain-based access control of SDP, to provide an SDP service to a customer in a blockchain manner, and solve problems that the SDP controller is attacked by DDoS and the SDP controller implements an incorrect authorization.

In order to solve the above technical problems, the disclosure is implemented as follows: according to a first aspect, a method for blockchain-based access control of SDP is provided, which includes the following operations.

An SDP connection accepting host transmits to-be-verified information to a blockchain system node. The to-be-verified information includes host information and a supported connection policy of the SDP connection accepting host, so that the to-be-verified information will be verified by the blockchain system node, and be recorded into a blockchain ledger after the verification is successful.

The SDP connection accepting host receives a connection request transmitted by an SDP connection initiating host.

The SDP connection accepting host searches in the blockchain ledger for a list of SDP connection accepting hosts accessible to the SDP connection initiating host, and provides an access service to the SDP connection initiating host when the SDP connection accepting host is in the list of SDP connection accepting hosts.

Preferably, the host information of the SDP connection accepting host includes at least one of: an IP address, a port, or protocol information; and the supported connection policy includes at least one of: a login identity (ID), an IP address or a geographic location of an access user, or a blockchain node verification or endorsement policy.

Preferably, the to-be-verified information further includes a signature of the SDP connection accepting host for the host information and the supported connection policy.

According to a second aspect, a method for blockchain-based access control of SDP is provided, which includes the following operations.

A blockchain system node receives to-be-verified information transmitted by an SDP connection accepting host. The to-be-verified information includes host information and a supported connection policy of the SDP connection accepting host.

The blockchain system node verifies the to-be-verified information, and records the information into a blockchain ledger after the verification is successful.

The blockchain system node receives an identity authentication request submitted by an SDP connection initiating host.

The blockchain system node verifies the identity authentication request submitted by the SDP connection initiating host, and receives a search request for a list of SDP connection accepting hosts accessible to the SDP connection initiating host transmitted by the SDP connection initiating host after the verification is successful.

The blockchain system node verifies the search request, searches for the list of SDP connection accepting hosts accessible to the SDP connection initiating host and records the list of SDP connection accepting hosts into the blockchain ledger after the verification is successful.

Preferably, the to-be-verified information further includes a signature of the SDP connection accepting host for the host information and the supported connection policy.

Preferably, when the SDP connection initiating host signs a timestamp with its own private key in the identity authentication request, the operation that the blockchain system node verifies the identity authentication request includes the following action.

The blockchain system node verifies the signature and the timestamp submitted by the SDP connection initiating host.

Preferably, when the identity authentication request includes a Key Derivation Function (KDF) or encrypted information of the KDF with a public key of an authentication node A1, the operation that the blockchain system node verifies the identity authentication request includes the following action.

The blockchain system node verifies whether the KDF is correct.

Preferably, when the identity authentication request includes a token or encrypted information of the token with a public key of an authentication node A2, the operation that the blockchain system node verifies the identity authentication request includes the following action.

The blockchain system node verifies whether the token is correct.

According to a third aspect, a method for blockchain-based access control of SDP is provided, which includes the following operations.

An SDP connection initiating host submits an identity authentication request to a blockchain system node.

The SDP connection initiating host receives, from the blockchain system node, a verified result for the identity authentication request submitted by the SDP connection initiating host.

The SDP connection initiating host transmits, to the blockchain system node, a search request for a list of SDP connection accepting hosts accessible to the SDP connection initiating host. The search request includes the verified result of the blockchain system node for the identity authentication request submitted by the SDP connection initiating host.

The SDP connection initiating host transmits a connection request to an SDP connection accepting host.

The SDP connection initiating host receives an access service provided by the SDP connection accepting host in the list of SDP connection accepting hosts.

Preferably, the SDP connection initiating host signs a timestamp with its own private key in the identity authentication request.

Preferably, when the SDP connection initiating host and an authentication node A1 share a user name and secret information, the identity authentication request includes a KDF or encrypted information of the KDF with a public key of the authentication node A1.

Preferably, when the SDP connection initiating host has a token provided by an authentication node A2, the identity authentication request includes the token or encrypted information of the token with a public key of the authentication node A2.

According to a fourth aspect, a device for blockchain-based access control of SDP is provided, which includes a first information verification module, a connection request initiation module and a first request response module.

The first information verification module is configured to transmit to-be-verified information to a blockchain system node. The to-be-verified information includes host information and a supported connection policy of an SDP connection accepting host, so that the to-be-verified information will be verified by the blockchain system node, and be recorded into a blockchain ledger after the verification is successful.

The connection request initiation module is configured to receive a connection request transmitted by an SDP connection initiating host.

The first request response module is configured to search in the blockchain ledger, for a list of SDP connection accepting hosts accessible to the SDP connection initiating host, and provide an access service to the SDP connection initiating host when the SDP connection accepting host is in the list of SDP connection accepting hosts.

Preferably, the host information of the SDP connection accepting host includes at least one of: an IP address, a port, or protocol information; and the supported connection policy includes at least one of: a login identity (ID), an IP address or a geographic location of an access user, or a blockchain node verification or endorsement policy.

Preferably, the to-be-verified information further includes a signature of the SDP connection accepting host for the host information and the supported connection policy.

According to a fifth aspect, a device for blockchain-based access control of SDP is provided, which includes a second information verification module, a first identity authentication request module, an identity verification module, a first search request module and a search verification module.

The second information verification module is configured to receive to-be-verified information transmitted by an SDP connection accepting host. The to-be-verified information includes host information and a supported connection policy of the SDP connection accepting host. The second information verification module is further configured to verify the to-be-verified information, and record the information into a blockchain ledger after the verification is successful.

The first identity authentication request module is configured to receive an identity authentication request submitted by an SDP connection initiating host.

The identity verification module is configured to verify the identity authentication request submitted by the SDP connection initiating host.

The first search request module is configured to receive a search request for a list of SDP connection accepting hosts accessible to the SDP connection initiating host transmitted by the SDP connection initiating host.

The search verification module is configured to verify the search request, search for the list of SDP connection accepting hosts accessible to the SDP connection initiating host and record the list of SDP connection accepting hosts into the blockchain ledger after the verification is successful.

Preferably, the to-be-verified information further includes a signature of the SDP connection accepting host for the host information and the supported connection policy.

Preferably, when the SDP connection initiating host signs a timestamp with its own private key in the identity authentication request, the operation of verifying the identity authentication request includes the following operation.

The signature and the timestamp submitted by the SDP connection initiating host are verified.

Preferably, when the identity authentication request includes a KDF or encrypted information of the KDF with a public key of an authentication node A1, the operation of verifying the identity authentication request includes the following operation.

Whether the KDF is correct, is verified.

Preferably, when the identity authentication request includes a token or encrypted information of the token with a public key of an authentication node A2, the operation of verifying the identity authentication request includes the following operation.

Whether the token is correct, is verified.

According to a sixth aspect, a device for blockchain-based access control of SDP is provided, which includes a second identity authentication request module, a verification feedback module, a second search request module, a connection request reception module and a second request response module.

The second identity authentication request module is configured to submit an identity authentication request to a blockchain system node.

The verification feedback module is configured to receive, from the blockchain system node, a verified result for the identity authentication request submitted by an SDP connection initiating host.

The second search request module is configured to transmit, to the blockchain system node, a search request for a list of SDP connection accepting hosts accessible to the SDP connection initiating host. The search request includes the verified result of the blockchain system node for the identity authentication request submitted by the SDP connection initiating host.

The connection request reception module is configured to transmit a connection request to an SDP connection accepting host.

The second request response module is configured to receive an access service provided by the SDP connection accepting host in the list of SDP connection accepting hosts.

Preferably, the SDP connection initiating host signs a timestamp with its own private key in the identity authentication request.

Preferably, when the SDP connection initiating host and an authentication node A1 share a user name and secret information, the identity authentication request includes a KDF or encrypted information of the KDF with a public key of the authentication node A1.

Preferably, when the SDP connection initiating host has a token provided by an authentication node A2, the identity authentication request includes the token or encrypted information of the token with a public key of the authentication node A2.

According to a seventh aspect, an SDP connection accepting host is provided, which includes a processor and a memory having stored thereon a program executable on the processor. The processor is configured to implement operations of the method for blockchain-based access control of SDP according to the first aspect or any possible implementation thereof.

According to an eighth aspect, a blockchain system node is provided, which includes a processor and a memory having stored thereon a program executable on the processor. The processor is configured to implement operations of the method for blockchain-based access control of SDP according to the second aspect or any possible implementation thereof.

According to a ninth aspect, an SDP connection initiating host is provided, which includes a processor and a memory having stored thereon a program executable on the processor. The processor is configured to implement operations of the method for blockchain-based access control of SDP according to the third aspect or any possible implementation thereof.

According to a tenth aspect, a computer-readable storage medium is provided, which has stored thereon a computer program that, when being executed by a processor, causes the processor to implement operations of the method for blockchain-based access control of SDP according to the first aspect or any possible implementation thereof; or to implement operations of the method for blockchain-based access control of SDP according to the second aspect or any possible implementation thereof; or to implement operations of the method for blockchain-based access control of SDP according to the third aspect or any possible implementation thereof.

In the embodiments of the disclosure, the SDP connection accepting host transmits the host information and the supported connection policy of the SDP connection accepting host to the blockchain system node; blockchain node verification and consensus are performed on the host information and the supported connection policy of the SDP connection accepting host, and the host information and the supported connection policy of the SDP connection accepting host after subjecting to the blockchain node verification and consensus are recorded into the blockchain ledger; the SDP connection initiating host submits the identity authentication request to the blockchain system node; the blockchain system node verifies the identity authentication request submitted by the SDP connection initiating host, and provides a feedback of the verified result to the SDP connection initiating host; the SDP connection initiating host transmits, to the blockchain system node, a search request for a list of SDP connection accepting hosts accessible to the SDP connection initiating host, the search request includes the verified result of the blockchain system node for the SDP connection initiating host; the blockchain system node searches for the list of SDP connection accepting hosts accessible to the SDP connection initiating host after verifying the search request, and records the list of SDP connection accepting hosts into the blockchain ledger; the SDP connection initiating host transmits a connection request to a to-be-accessed SDP connection accepting host; the to-be-accessed SDP connection accepting host searches in the blockchain ledger, for a list of SDP connection accepting hosts accessible to the SDP connection initiating host, and provides an access service to the SDP connection initiating host when the to-be-accessed SDP connection accepting host is in the list of SDP connection accepting hosts. According to the embodiments of the disclosure, SDP services are provided to the customer in a blockchain manner, and authentication, request, or the like are verified, so that on one hand, the SDP controller may be prevented from being attacked by DDoS, and on the other hand, the SDP controller may be prevented from implementing an incorrect authorization.

BRIEF DESCRIPTION OF THE DRAWINGS

Various other advantages and benefits will become apparent to those of ordinary skill in the art by reading the following detailed descriptions of preferred embodiments. The drawings are intended to illustrate the preferred embodiments only and are not considered as limitation of the disclosure. Furthermore, the same reference symbol is used to represent the same component throughout the drawings. In the drawings:

FIG. 4 is a flowchart illustrating a method for blockchain-based access control of SDP according to an embodiment of the disclosure;

FIG. 5 is a flowchart illustrating a method for blockchain-based access control of SDP according to another embodiment of the disclosure;

FIG. 6 is a flowchart illustrating a method for blockchain-based access control of SDP according to yet another embodiment of the disclosure;

FIG. 7 is a schematic diagram illustrating a device for blockchain-based access control of SDP according to an embodiment of the disclosure;

FIG. 8 is a schematic diagram illustrating a device for blockchain-based access control of SDP according to another embodiment of the disclosure; and FIG. 9 is a schematic diagram illustrating a device for blockchain-based access control of SDP according to yet another embodiment of the disclosure.

DETAILED DESCRIPTION

Technical solutions in the embodiments of the disclosure will be clearly and completely described below with reference to the drawings in the embodiments of the disclosure. It is apparent that the described embodiments are part of the embodiments of the disclosure, rather than all of the embodiments. Based on the embodiments of the disclosure, all other embodiments obtained by those of ordinary skill in the art without paying any creative work shall fall within the scope of protection of the disclosure.

Figure 1:
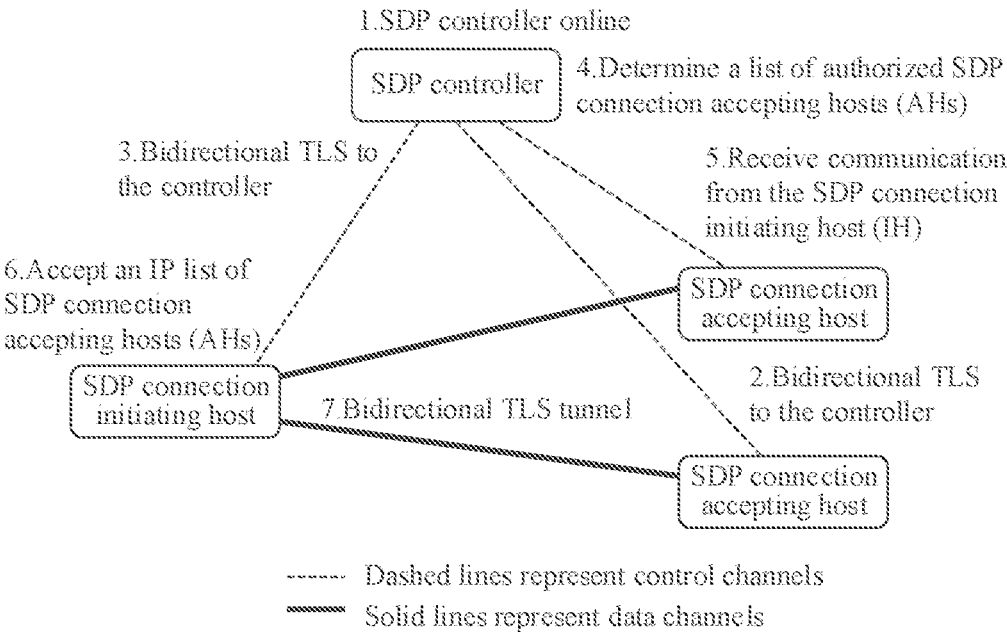
FIG. 1 is a schematic diagram of an SDP control in the related art.
Figure 2:
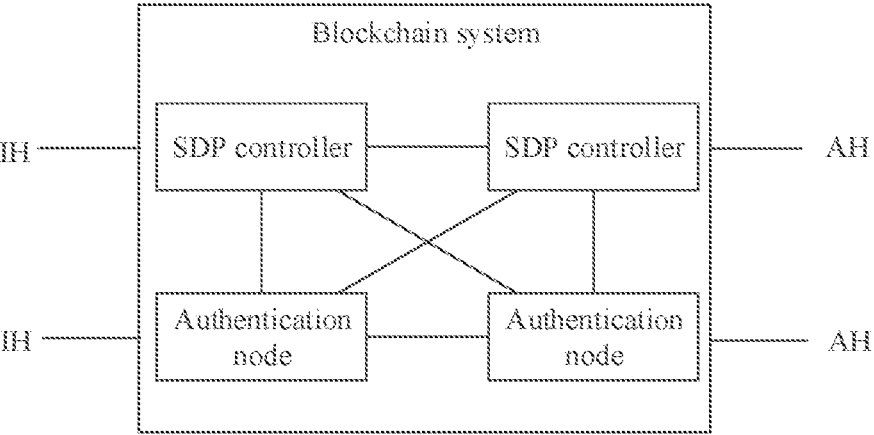
FIG. 2 illustrates an architecture of a blockchain system node according to an embodiment of the disclosure.
Figure 3:
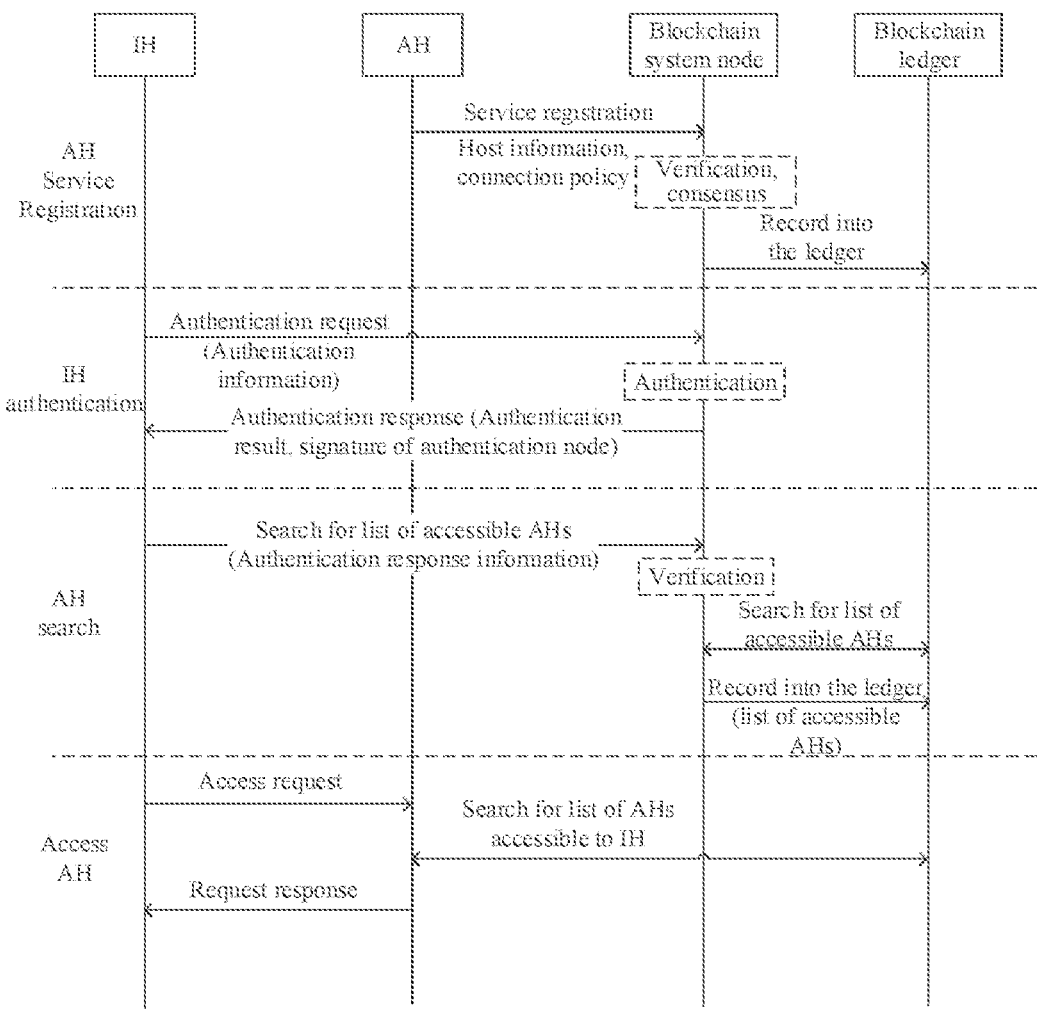
FIG. 3 is a thread diagram illustrating a blockchain-based access control of SDP according to an embodiment of the disclosure.

With the aid of FIG. 1, FIG. 2 and FIG. 3, and with reference to FIG. 4, a method for blockchain-based access control of Software Defined Perimeter (SDP) is provided, which includes the following operations S11 to S13.

At S11, an SDP connection accepting host transmits to-be-verified information to a blockchain system node. The to-be-verified information includes host information and a supported connection policy of the SDP connection accepting host, so that the to-be-verified information will be verified by the blockchain system node, and be recorded into a blockchain ledger after the verification is successful.

At S12, the SDP connection accepting host receives a connection request transmitted by an SDP connection initiating host.

At S13, the SDP connection accepting host searches in the blockchain ledger, for a list of SDP connection accepting hosts accessible to the SDP connection initiating host, and provides an access service to the SDP connection initiating host when the SDP connection accepting host is in the list of SDP connection accepting hosts.

In the embodiment, the host information of the SDP connection accepting host includes at least one of: an IP address, a port, or protocol information; and the supported connection policy includes at least one of: a login identity (ID), an IP address or a geographic location of an access user, or a blockchain node verification or endorsement policy. The SDP connection accepting host transmits the host information (such as the IP address, the port and the protocol information, or the like) and the supported connection policy (such as the login ID, the IP address and the geographic location of the supported access user and the blockchain node verification/endorsement policy, or the like) of the SDP connection accepting host to the blockchain system node.

Specifically, a signature of the SDP connection accepting host for the host information and the supported connection policy of the SDP connection accepting host may also be transmitted to the blockchain system node, and the blockchain node verifies the information submitted by the SDP connection accepting host and the signature thereof. After the verification is successful, the blockchain node records the host information and the supported connection policy of the SDP connection accepting host submitted by the SDP connection accepting host into the blockchain ledger.

With reference to FIG. 2, the blockchain system node is formed by a SDP controller and an authentication node connected to each other, and both the SDP controller and the authentication node are blockchain nodes. The SDP connection accepting host and the SDP connection initiating host may submit a transaction to the blockchain, and may read ledger data from the blockchain.

Specifically, the SDP connection initiating host submits an identity authentication request to the blockchain system node by: the SDP connection initiating host signing a timestamp with its own private key.

Specifically, the blockchain system node verifies the signature and timestamp in the identity authentication request submitted by the SDP connection initiating host. The SDP connection initiating host signs the timestamp with its own private key. The signature and timestamp are verified when the SDP connection initiating host signs the timestamp with its own private key.

In the embodiment, when the SDP connection initiating host and an authentication node A1 share a user name and secret information, the identity authentication request includes a KDF(timestamp, username, password), and the KDF(timestamp, username, password) is encrypted with a public key of the authentication node A1. At S4, the blockchain system node verifies whether the KDF(timestamp, username, password) in the identity authentication request submitted by the SDP connection initiating host is correct.

Specifically, when the SDP connection initiating host and the authentication node A1 share the user name and secret information such as a user password, the authentication request information includes the KDF(timestamp, username, password), and the KDF(timestamp, username, password) is encrypted with the public key of the authentication node A1, for example, Epk_A1(KDF(time stamp, username, password)).

The KDF is a way to implement key stretching, specifically, one or more keys are derived from a master key, a password, or a passphrase, and a Pseudo Random Function (PRF) used during derivation may be a certain hash algorithm.

For example, PBKDF2 is an algorithm for deriving a key based on a password, and requires consumption of much computing power, to prevent encryption from being brute-force cracked. Scrypt is a password-based KDF algorithm, and requires consumption of more resources than the PBKDF2, to effectively prevent a dedicated hardware ASIC/FPGA from being brute-force cracked. The PBKDF2 algorithm is used inside the Scrypt. However, a set of bit data may be maintained inside the Scrypt for a long time, and these data may be obtained by repeatedly encrypting (Salsa 20, a stream password) in a process of generating a complex salt.

Specifically, when the SDP connection initiating host has a token provided by an authentication node A2, the identity authentication request includes the token, and the token is encrypted with a public key of the authentication node A2.

Specifically, the blockchain system node verifies whether the token in the identity authentication request submitted by the SDP connection initiating host is correct. After the identity authentication is successful, the blockchain node searches for SDP connection accepting hosts and policy information in the ledger, and returns a list of SDP connection accepting hosts accessible to the SDP connection initiating host as a response result to the SDP connection initiating host. A signature made by the blockchain node for the response result is included in the response result and the signature may include signatures made by one or multiple nodes. When the SDP connection accepting host specifies a verification/endorsement node in the policy, the node specified by the SDP connection accepting host is required to sign the response result.

Specifically, the token means a flag or mark, and is called as Token in the IT field. In computer identity authentication, the token (temporary) is usually used as an invitation and used to log in a system. Before transmission of some data, a cipher should be checked first, and different ciphers are authorized for different data operations. For example, four types of data packets, i.e., a token packet, a data packet, a handshake packet and a special packet, are defined in a Universal Serial Bus (USB) 1.1 protocol. Continuous exchange of data between a host and a USB device may include three stages: in the first stage, the token packet is transmitted by the host, different token packets have different contents (different ciphers) and may instruct the device to perform different operations; in the second phase, the data packet is transmitted; and in the third phase, the handshake packet is returned by the device.

In the embodiment, the SDP connection initiating host transmits, to the blockchain system node, a search request for a list of SDP connection accepting hosts accessible to the SDP connection initiating host. The blockchain system node verifies the search request, when the verification is successful, the blockchain system node searches for the list of SDP connection accepting hosts accessible to the SDP connection initiating host and records the SDP connection initiating host and the list of SDP connection accepting hosts accessible to the SDP connection initiating host into the blockchain ledger.

Specifically, the SDP connection initiating host and the list of SDP connection accepting hosts accessible to the SDP connection initiating host may be encrypted and then be recorded into the blockchain, in such way, the SDP connection accepting host may not able to search for the list accessible to the SDP connection initiating host, and the SDP connection accepting host may only know a result whether it can be accessed by the SDP connection initiating host.

Specifically, the information of the SDP connection initiating host and the SDP connection accepting hosts accessible to the SDP connection initiating host is marked as info_IH_AH, which may be encrypted as follows.

(Epk_IH (K), Ek (info_IH_AH)), where pk_IH is the public key of IH.

In the embodiment, when the to-be-accessed SDP connection accepting host is not in the list of SDP connection accepting hosts, the to-be-accessed SDP connection accepting host does not respond.

The SDP connection initiating host submits an access request to the SDP connection accepting host, and the access request includes the location information of the list of SDP connection accepting hosts accessible to the SDP connection initiating host in the blockchain ledger.

In addition, when the records of the SDP connection initiating host and the list of SDP connection accepting hosts accessible to the SDP connection initiating host are encrypted, decryption key information is also carried in the access request, and the decryption key information may be described as follows.

(Epk_AH (K)), where pk_AH is the public key of AH.

Specifically, the SDP connection accepting host searches for the blockchain ledge, and when the SDP connection accepting host is in the list of SDP connection accepting hosts accessible to the SDP connection initiating host, a connection is established; otherwise, no response is made.

In addition, when the records for the SDP connection initiating host and the list of SDP connection accepting hosts accessible to the SDP connection initiating host are encrypted, the SDP connection accepting host also needs to decrypt the key K with its own private key sk_AH, and decrypts DK(Ek(info_IH_AH)) with the key K, to obtain info_IH_AH.

Accordingly, in the embodiment, the SDP connection accepting host transmits the host information and the supported connection policy of the SDP connection accepting host to the blockchain system node; blockchain node verification and consensus are performed on the host information and the supported connection policy of the SDP connection accepting host, and the host information and the supported connection policy of the SDP connection accepting host after subjecting to the blockchain node verification and consensus are recorded into the blockchain ledger; the SDP connection initiating host submits the identity authentication request to the blockchain system node; the blockchain system node verifies the identity authentication request submitted by the SDP connection initiating host, and provides a feedback of the verified result to the SDP connection initiating host; the SDP connection initiating host transmits, to the blockchain system node, a search request for a list of SDP connection accepting hosts accessible to the SDP connection initiating host, the search request includes the verified result of the blockchain system node for the SDP connection initiating host; the blockchain system node searches for the list of SDP connection accepting hosts accessible to the SDP connection initiating host after verifying the search request, and records the list of SDP connection accepting hosts into the blockchain ledger; the SDP connection initiating host transmits a connection request to a to-be-accessed SDP connection accepting host; the to-be-accessed SDP connection accepting host searches in the blockchain ledger, for the list of SDP connection accepting hosts accessible to the SDP connection initiating host, and provides an access service to the SDP connection initiating host when the to-be-accessed SDP connection accepting host is in the list of SDP connection accepting hosts. According to the embodiments of the disclosure, SDP services are provided to the customer in a blockchain manner, and authentication, request, or the like are verified, so that on one hand, the SDP controller may be prevented from being attacked by DDoS, and on the other hand, the SDP controller may be prevented from implementing an incorrect authorization.

With the aid of FIG. 1, FIG. 2 and FIG. 3, and with reference to FIG. 5, a method for blockchain-based access control of SDP is provided, which includes the following operations S21 to S25.

At S21, a blockchain system node receives to-be-verified information transmitted by an SDP connection accepting host. The to-be-verified information includes host information and a supported connection policy of the SDP connection accepting host.

At S22, the blockchain system node verifies the to-be-verified information, and records the information into a blockchain ledger after the verification is successful.

At S23, the blockchain system node receives an identity authentication request submitted by an SDP connection initiating host.

At S24, the blockchain system node verifies the identity authentication request submitted by the SDP connection initiating host, and receives a search request for a list of SDP connection accepting hosts accessible to the SDP connection initiating host transmitted by the SDP connection initiating host after the verification is successful.

At S25, the blockchain system node verifies the search request, and searches for the list of SDP connection accepting hosts accessible to the SDP connection initiating host and records the list of SDP connection accepting hosts into the blockchain ledger after the verification is successful.

In the embodiment, the to-be-verified information further includes a signature of the SDP connection accepting host for the host information and the supported connection policy.

Specifically, when the SDP connection initiating host signs a timestamp with its own private key in the identity authentication request, the operation that the blockchain system node verifies the identity authentication request includes the following action.

The blockchain system node verifies the signature and timestamp submitted by the SDP connection initiating host.

Preferably, when the identity authentication request includes a KDF or encrypted information of the KDF with a public key of an authentication node A1, the operation that the blockchain system node verifies the identity authentication request includes the following action.

The blockchain system node verifies whether the KDF is correct.

Specifically, when the identity authentication request includes a token or encrypted information of the token with a public key of an authentication node A2, the operation that the blockchain system node verifies the identity authentication request includes the following action.

The blockchain system node verifies whether the token is correct.

The method for blockchain-based access control of SDP in the embodiment is an implementation at the blockchain system node side corresponding to the method illustrated in FIG. 4, and specific implementation details are the same as descriptions of the method illustrated in FIG. 4, and are not elaborated here.

With the aid of FIG. 1, FIG. 2 and FIG. 3, and with reference to FIG. 6, a method for blockchain-based access control of SDP is provided, which includes the following operations S31 to S34.

At S31, an SDP connection initiating host submits an identity authentication request to a blockchain system node.

At S32, the SDP connection initiating host receives, from the blockchain system node, a verified result for the identity authentication request submitted by the SDP connection initiating host.

At S33, the SDP connection initiating host transmits, to the blockchain system node, a search request for a list of SDP connection accepting hosts accessible to the SDP connection initiating host. The search request includes the verified result of the blockchain system node for the identity authentication request submitted by the SDP connection initiating host.

At S34, the SDP connection initiating host transmits a connection request to an SDP connection accepting host. The SDP connection initiating host receives an access service provided by the SDP connection accepting host in the list of SDP connection accepting hosts.

Specifically, the SDP connection initiating host signs a timestamp with its own private key in the identity authentication request.

Specifically, when the SDP connection initiating host and an authentication node A1 share a user name and secret information, the identity authentication request includes a KDF or encrypted information of the KDF with a public key of the authentication node A1.

Specifically, when the SDP connection initiating host has a token provided by an authentication node A2, the identity authentication request includes the token or encrypted information of the token with a public key of the authentication node A2.

The method for blockchain-based access control of SDP in the embodiment is an implementation at the SDP connection initiating host side corresponding to the method illustrated in FIG. 4, and specific implementation details are the same as descriptions of the method illustrated in FIG. 4, and are not elaborated here.

With the aid of FIG. 1, FIG. 2 and FIG. 3, and with reference to FIG. 7, a device for blockchain-based access control of SDP is provided, which includes a first information verification module 41, a connection request initiation module 42 and a first request response module 43.

The first information verification module is configured to transmit to-be-verified information to a blockchain system node. The to-be-verified information includes host information and a supported connection policy of an SDP connection accepting host, so that the to-be-verified information will be verified by the blockchain system node, and be recorded into a blockchain ledger after the verification is successful.

The connection request initiation module is configured to receive a connection request transmitted by an SDP connection initiating host.

The first request response module is configured to search in the blockchain ledger, for a list of SDP connection accepting hosts accessible to the SDP connection initiating host, and provide an access service to the SDP connection initiating host when the SDP connection accepting host is in the list of SDP connection accepting hosts.

Specifically, the host information of the SDP connection accepting host includes at least one of: an IP address, a port, or protocol information; and the supported connection policy includes at least one of: a login ID, an IP address or a geographic location of an access user, or a blockchain node verification or endorsement policy.

Specifically, the to-be-verified information further includes a signature of the SDP connection accepting host for the host information and the supported connection policy.

The device for blockchain-based access control of SDP in the embodiment of the disclosure is a product implementation solution corresponding to the method illustrated in FIG. 4, specific implementation details are the same as the method illustrated in FIG. 4, and are not elaborated here.

With the aid of FIG. 1, FIG. 2 and FIG. 3, and with reference to FIG. 8, a device for blockchain-based access control of SDP is provided, which includes a second information verification module 51, a first identity authentication request module 52, an identity verification module 53, a first search request module 54 and a search verification module 55.

The second information verification module is configured to receive to-be-verified information transmitted by an SDP connection accepting host. The to-be-verified information includes host information and a supported connection policy of the SDP connection accepting host. The second information verification module is further configured to verify the to-be-verified information, and record the information into a blockchain ledger after the verification is successful.

The first identity authentication request module is configured to receive an identity authentication request submitted by an SDP connection initiating host.

The identity verification module is configured to verify the identity authentication request submitted by the SDP connection initiating host.

The first search request module is configured to receive a search request for a list of SDP connection accepting hosts accessible to the SDP connection initiating host transmitted by the SDP connection initiating host.

The search verification module is configured to verify the search request, and search for the list of SDP connection accepting hosts accessible to the SDP connection initiating host and record the list of SDP connection accepting hosts into the blockchain ledger after the verification is successful.

Specifically, the to-be-verified information further includes a signature of the SDP connection accepting host for the host information and the supported connection policy.

Specifically, when the SDP connection initiating host signs a timestamp with its own private key in the identity authentication request, the operation of verifying the identity authentication request includes the following action.

The signature and timestamp submitted by the SDP connection initiating host are verified.

Specifically, when the identity authentication request includes a KDF or encrypted information of the KDF with a public key of an authentication node A1, the operation of the verifying the identity authentication request includes the following action.

Whether the KDF is correct, is verified.

Specifically, when the identity authentication request includes a token or encrypted information of the token with a public key of an authentication node A2, the operation of verifying the identity authentication request includes the following action.

Whether the token is correct, is verified.

The device for blockchain-based access control of SDP in the embodiment of the disclosure is a product implementation solution corresponding to the method illustrated in FIG. 5, specific implementation details are the same as the method illustrated in FIG. 5, and are not elaborated here.

With the aid of FIG. 1, FIG. 2 and FIG. 3, and with reference to FIG. 9, a device for blockchain-based access control of SDP is provided, which includes a second identity authentication request module 61, a verification feedback module 62, a second search request module 63, a connection request reception module 64 and a second request response module 65.

The second identity authentication request module is configured to submit an identity authentication request to a blockchain system node.

The verification feedback module is configured to receive, from the blockchain system node, a verified result for the identity authentication request submitted by an SDP connection initiating host.

The second search request module is configured to transmit, to the blockchain system node, a search request for a list of SDP connection accepting hosts accessible to the SDP connection initiating host. The search request includes the verified result of the blockchain system node for the identity authentication request submitted by the SDP connection initiating host.

The connection request reception module is configured to transmit a connection request to an SDP connection accepting host.

The second request response module is configured to receive an access service provided by the SDP connection accepting host in the list of SDP connection accepting hosts.

Specifically, the SDP connection initiating host signs a timestamp with its own private key in the identity authentication request.

Specifically, when the SDP connection initiating host and an authentication node A1 share a user name and secret information, the identity authentication request includes a KDF or encrypted information of the KDF with a public key of the authentication node A1.

Specifically, when the SDP connection initiating host has a token provided by an authentication node A2, the identity authentication request includes the token or encrypted information of the token with a public key of the authentication node A2.

The device for blockchain-based access control of SDP in the embodiment of the disclosure is a product implementation solution corresponding to the method illustrated in FIG. 6, specific implementation details are the same as the method illustrated in FIG. 6, and are not elaborated here.

The disclosure provides an SDP connection accepting host, including a processor and a memory having stored thereon a program executable on the processor. The processor is configured to implement operations of the method for blockchain-based access control of SDP illustrated in FIG. 4 or any possible implementation thereof, when the program is executed by the processor.

The disclosure provides a blockchain system node, including a processor and a memory having stored thereon a program executable on the processor. The processor is configured to implement operations of the method for blockchain-based access control of SDP illustrated in FIG. 5 or any possible implementation thereof, when the program is executed by the processor.

The disclosure provides an SDP connection initiating host, including a processor and a memory having stored thereon a program executable on the processor. The processor is configured to implement operations of the method for blockchain-based access control of SDP illustrated in FIG. 6 or any possible implementation thereof, when the program is executed by the processor.

The disclosure provides a computer-readable storage medium having stored thereon a computer program that, when being executed by a processor, causes the processor to implement operations of the method for blockchain-based access control of SDP illustrated in FIG. 4 or any possible implementation thereof, or causes the processor to implement operations of the method for blockchain-based access control of SDP illustrated in FIG. 5 or any possible implementation thereof, or causes the processor to implement operations of the method for blockchain-based access control of SDP illustrated in FIG. 6 or any possible implementation thereof.

Specifically, the computer-readable storage medium may be any usable medium accessible by a computer, or a data storage device including a server or a data center integrated with one or more usable media, or the like. The usable medium may be a magnetic medium (such as a floppy disk, a hard disk, or a magnetic tape), an optical medium (such as a Digital Versatile Disk (DVD)), or a semiconductor medium (such as a Solid State Disk (SSD)), or the like.

Specifically, the processor may be implemented by hardware, or by software. When the processor is implemented by hardware, the processor may be a logic circuit, an integrated circuit, or the like. When the processor is implemented by software, the processor may be a general-purpose processor implemented by reading software codes stored in a memory, and the memory may be integrated in the processor, and may be located outside the processor and exist independently.

All or part of the above embodiments may be implemented by software, hardware, firmware, or any combination thereof. When the embodiments are implemented by software, all or part of the embodiments may be implemented in form of a computer program product. The computer program product includes one or more computer instructions. When the computer program instructions are loaded and executed on a computer, all or part of the processes or functions according to the embodiments of the disclosure are generated. The computer may be a general-purpose computer, a special-purpose computer, a computer network, or another programmable device. The computer instructions may be stored in a computer-readable storage medium, or transmitted from one computer-readable storage medium to another computer-readable storage medium, for example, the computer instructions may be transmitted from one website, computer, server, or data center to another website, computer, server, or data center in a wired (e.g., coaxial cable, optical fiber, Digital Subscriber Line (DSL)) or wireless (e.g., infrared, wireless, microwave, or the like) way.

Specifically, a Central Processing Unit (CPU) performs various processes according to a program stored in a Read-Only Memory (ROM) or a program loaded from a storage portion to a Random Access Memory (RAM). In the RAM, data required for the CPU to perform various processes or the like, is also stored as required. The CPU, ROM and RAM are connected to each other via a bus. An input/output interface is also connected to the bus.

The following components are connected to the input/output interface: an input portion (including a keyboard, a mouse, or the like), an output portion (including a display such as a Cathode Ray Tube (CRT), a Liquid Crystal Display (LCD), a loudspeaker, or the like), a storage portion (including a hard disk, or the like), a communication portion (including a network interface card, such as a Local Area Network (LAN) card, a modem, or the like). The communication portion performs communication processes via a network such as the Internet. A driver may also be connected to the input/output interface as required. A removable medium such as a magnetic disk, an optical disk, a magneto-optical disk, a semiconductor memory, or the like may be installed on the driver as required, such that a computer program read therefrom is installed into the storage portion as required.

When the above series of processes are implemented by software, a program constituting the software is installed from a network such as the Internet or a storage medium such as a removable medium.

It should be understood by those skilled in the art that such storage medium is not limited to the removable medium where the program is stored, distributed separately from a device to provide the program to the user. Examples of the removable medium include a magnetic disk (including a floppy disk (registered trademark)), an optical disk (including a Compact Disk Read-Only Memory (CD-ROM) and a DVD), a magneto-optical disk (including a Mini-Disk (MD) (registered trademark)), and a semiconductor memory. Or, the storage medium may be a ROM, a hard disk included in the storage portion, or the like, where programs are stored and are distributed to the user along with devices containing them.

It should be understood by those skilled in the art that the above modules or operations of the embodiments of the disclosure may be implemented by a general-purpose computing device, and may be concentrated on a single computing device or distributed on a network formed by multiple computing devices; optionally, the above modules or operations may be implemented by program codes executable by the computing device, so that the above modules or operations may be stored in the storage medium and executed by the computing device. In some cases, the illustrated or described operations may be performed in an order different from the order described here, or the illustrated or described operations are made into various integrated circuit modules respectively, or multiple modules or operations in the illustrated or described operations are made into a single integrated circuit module. In this way, the embodiments of the disclosure are not limited to any specific combination of hardware and software.

The embodiments of the disclosure are described above with reference to the drawings. However, the disclosure is not limited to the above specific implementations, and the above specific implementations are merely illustrative, rather than limitation. Many forms made by those of ordinary skill in the art under the inspiration of the disclosure, without departing from the principle of the disclosure and the scope of protection of the claims, shall fall with the scope of protection of the disclosure.

What is claimed is:

1. A method for blockchain-based access control of Software Defined Perimeter (SDP), comprising:

transmitting, by an SDP connection accepting host, to-be-verified information to a blockchain system node, the to-be-verified information comprising host information and a supported connection policy of the SDP connection accepting host, so that the to-be-verified information will be verified by the blockchain system node, and be recorded into a blockchain ledger after the verification is successful;

receiving, by the SDP connection accepting host, a connection request transmitted by an SDP connection initiating host; and searching in the blockchain ledger, by the SDP connection accepting host, for a list of SDP connection accepting hosts accessible to the SDP connection initiating host, providing an access service to the SDP connection initiating host when the SDP connection accepting host is in the list of SDP connection accepting hosts, and providing no response to the SDP connection initiating host when the SDP connection accepting host is not in the list of SDP connection accepting hosts.

2. The method for blockchain-based access control of SDP of claim 1, wherein the host information of the SDP connection accepting host comprises at least one of: an Internet Protocol (IP) address, a port, or protocol information; and the supported connection policy comprises at least one of: a login identity (ID), an IP address or a geographic location of an access user, or a blockchain node verification or endorsement policy.

3. The method for blockchain-based access control of SDP of claim 1, wherein the to-be-verified information further comprises a signature of the SDP connection accepting host for the host information and the supported connection policy.

4. A Software Defined Perimeter (SDP) connection accepting host for implementing the method of claim 1, comprising:

a processor; and a memory having stored thereon a program executable on the processor, wherein the processor is configured to execute the program stored in the memory to perform steps of the method.

5. A non-transitory computer-readable storage medium having stored thereon a computer program that, when being executed by a processor, causes the processor to implement steps of the method of claim 1.

6. A method for blockchain-based access control of Software Defined Perimeter (SDP), comprising:

receiving, by a blockchain system node, to-be-verified information transmitted by an SDP connection accepting host, the to-be-verified information comprising host information and a supported connection policy of the SDP connection accepting host;

verifying, by the blockchain system node, the to-be-verified information and recording the information into a blockchain ledger after the verification is successful;

receiving, by the blockchain system node, an identity authentication request submitted by an SDP connection initiating host;

verifying, by the blockchain system node, the identity authentication request submitted by the SDP connection initiating host, and receiving, by the blockchain system node, a search request for a list of SDP connection accepting hosts accessible to the SDP connection initiating host transmitted by the SDP connection initiating host after the verification is successful; and verifying, by the blockchain system node, the search request, searching, by the blockchain system node, for the list of SDP connection accepting hosts accessible to the SDP connection initiating host, and recording, by the blockchain system node, the list of SDP connection accepting hosts into the blockchain ledger after the verification is successful, such that the list of SDP connection accepting hosts accessible to the SDP connection initiating host is searched by the SDP connection accepting host from the blockchain ledger to provide an access service to the SDP connection initiating host when the SDP connection accepting host is in the list of SDP connection accepting hosts, and provide no response to the SDP connection initiating host when the SDP connection accepting host is not in the list of SDP connection accepting hosts.

7. The method for blockchain-based access control of SDP of claim 6, wherein the to-be-verified information further comprises a signature of the SDP connection accepting host for the host information and the supported connection policy.

8. The method for blockchain-based access control of SDP of claim 6, wherein when the SDP connection initiating host signs a timestamp with its own private key in the identity authentication request, verifying, by the blockchain system node, the identity authentication request comprises:

verifying, by the blockchain system node, the signature and the timestamp submitted by the SDP connection initiating host.

9. The method for blockchain-based access control of SDP of claim 6, wherein when the identity authentication request comprises a Key Derivation Function (KDF) or encrypted information of the KDF with a public key of an authentication node, verifying, by the blockchain system node, the identity authentication request comprises:

verifying, by the blockchain system node, whether the KDF is correct.

10. The method for blockchain-based access control of SDP of claim 6, wherein when the identity authentication request comprises a token or encrypted information of the token with a public key of an authentication node, verifying, by the blockchain system node, the identity authentication request comprises:

verifying, by the blockchain system node, whether the token is correct.

11. A blockchain system node for implementing the method of claim 6, comprising:

a processor, and a memory having stored thereon a program executable on the processor, wherein the processor is configured to execute the program stored in the memory to perform steps of the method.

12. A method for blockchain-based access control of Software Defined Perimeter (SDP), comprising:

submitting, by an SDP connection initiating host, an identity authentication request to a blockchain system node;

receiving, by the SDP connection initiating host from the blockchain system node, a verified result for the identity authentication request submitted by the SDP connection initiating host;

transmitting, by the SDP connection initiating host to the blockchain system node, a search request for a list of SDP connection accepting hosts accessible to the SDP connection initiating host, the search request comprising the verified result of the blockchain system node for the identity authentication request submitted by the SDP connection initiating host;

transmitting, by the SDP connection initiating host, a connection request to an SDP connection accepting host;

receiving, by the SDP connection initiating host, an access service provided by the SDP connection accepting host in the list of SDP connection accepting hosts; and receiving, by the SDP connection initiating host, no response from the SDP connection accepting host when the SDP connection accepting host is not in the list of SDP connection accepting hosts.

13. The method for blockchain-based access control of SDP of claim 12, wherein the SDP connection initiating host signs a timestamp with its own private key in the identity authentication request.

14. The method for blockchain-based access control of SDP of claim 12, wherein when the SDP connection initiating host and an authentication node share a user name and secret information, the identity authentication request comprises a Key Derivation Function (KDF) or encrypted information of the KDF with a public key of the authentication node.

15. The method for blockchain-based access control of SDP of claim 12, wherein when the SDP connection initiating host has a token provided by an authentication node, the identity authentication request comprises the token or encrypted information of the token with a public key of the authentication node.

16. A Software Defined Perimeter (SDP) connection initiating host for implementing the method of claim 12, comprising:

a processor, and a memory having stored thereon a program executable on the processor, wherein the processor is configured to execute the program stored in the memory to perform steps of the method.

* * * * *